United States Patent [19]

Danisch

[11] Patent Number: 4,880,971

[45] Date of Patent: Nov. 14, 1989

[54] FIBER OPTIC LIQUID LEVEL SENSOR

[76] Inventor: Lee A. Danisch, 422 Northumberland Street, Fredericton, New Brunswick, Canada, E3B 3K4

[21] Appl. No.: 156,660

[22] Filed: Feb. 17, 1988

[51] Int. Cl.[4] .......................... H01J 5/16; G01F 23/00
[52] U.S. Cl. .................................. 250/227; 250/577; 73/293
[58] Field of Search ................ 250/577, 227; 340/619; 73/293; 356/133, 134, 135, 136, 137

[56] References Cited

U.S. PATENT DOCUMENTS

| | | | |
|---|---|---|---|
| 3,448,616 | 6/1969 | Wostl et al. | 250/577 |
| 4,038,650 | 7/1977 | Evans et al. | 340/619 |
| 4,039,845 | 8/1977 | Oberhänsli et al. | 250/577 |
| 4,159,420 | 6/1979 | Tsunoda | 250/227 |
| 4,311,048 | 1/1982 | Merz | 73/293 |
| 4,745,293 | 5/1988 | Christensen | 250/577 |

Primary Examiner—David C. Nelms
Assistant Examiner—William L. Oen
Attorney, Agent, or Firm—Sidney T. Jelly

[57] ABSTRACT

A liquid level sensor comprises a probe containing closely spaced therein an elongate light emitter and an elongate light collector, the housing of the probe permitting light to issue from the interior from the emitter and to return to the collector. A light transmitting medium fills the probe housing. Means are provided for feeding light to the emitter and from the collector. An indicator can be provided, adapted to provide a level indication obtained form the light fed from the collector.

14 Claims, 3 Drawing Sheets

U.S. Patent  Nov. 14, 1989  Sheet 1 of 3  4,880,971
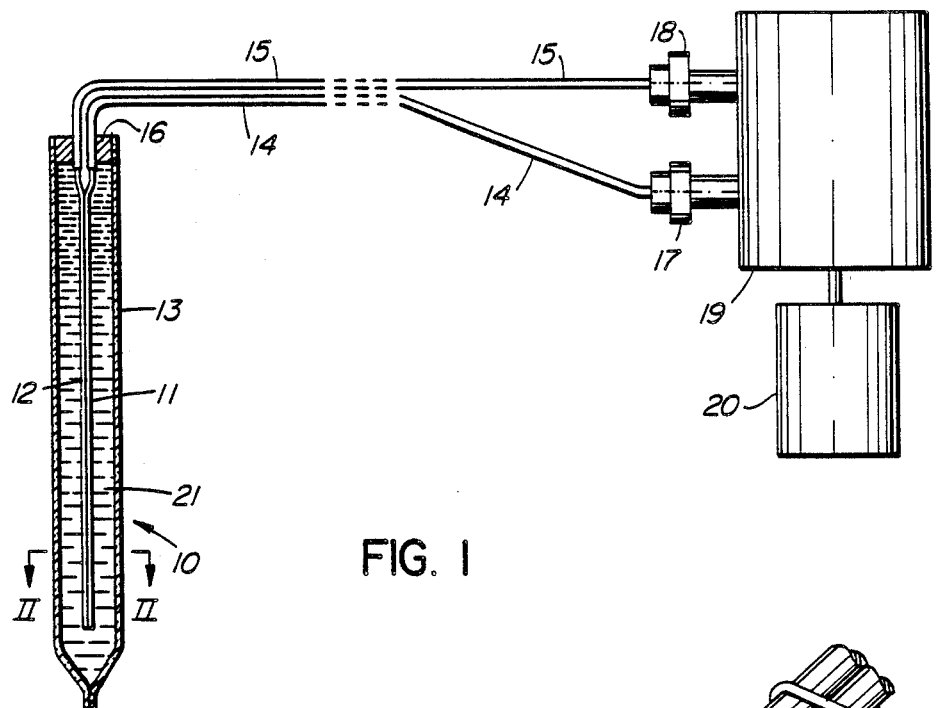
FIG. 1
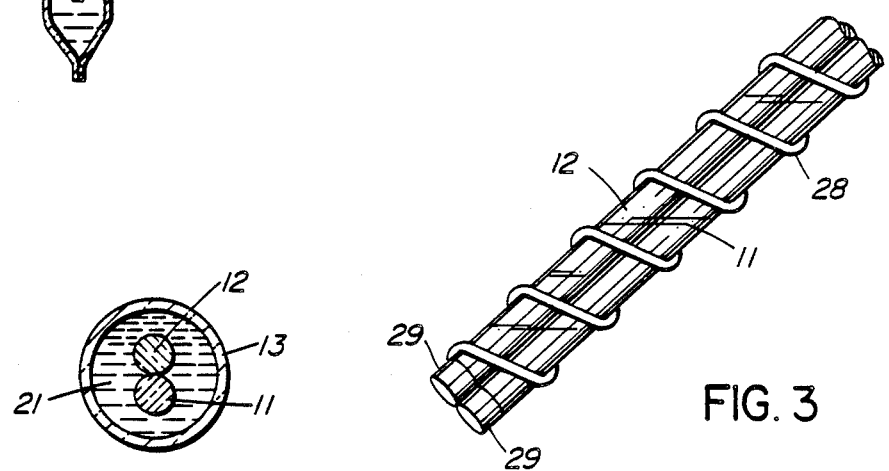
FIG. 2
FIG. 3
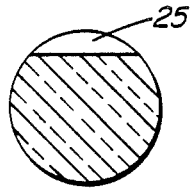
FIG. 4
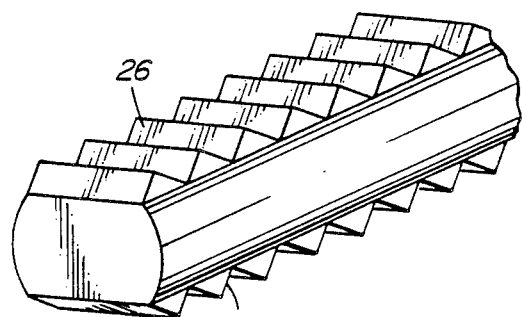
FIG. 5

FIBER OPTIC LIQUID LEVEL SENSOR

This invention relates to an electro-optical liquid level sensor, and an indicator system embodying the sensor.

Various methods presently exist for measuring the height, or level, of liquids in containers. Such methods may operate continuously or step-wise. Typical examples are capacitance probes, ultrasonic measurement and optical probes based on the measurement of changes in the critical angle of refraction.

Capacitance probes measure changes in the dielectric constant as a liquid covers the insulated sensor rod, or rods. They are subject to long term drift and electrical interference. They must be recalibrated for each liquid change. Ultrasonic systems are best suited to measurements of tens of feet as their resolution is limited by the length of the sound-waves, and variability of the speed of sound in air. Also, the various sensors are not easily made compatible with high purity environments, such as in the semi-conductor industry and many other industries.

Optical probes using changes in the critical angle of refraction must be recalibrated for changes in liquids which have different indices of refraction. They are sensitive to small changes in the optical characteristics of the liquid. They are particularly sensitive to small changes of index when the probe is of quartz, as is necessary for the semi-conductor industry. This is because the liquids to be measured often have indices close to that of quartz, greatly limiting the sensitivity of the instrument.

The present invention measures changes in the critical angle, but in a totally different way that makes it insensitive to changes in the index of refraction, less sensitive to cloudiness and contamination, capable of measuring liquids of very small index, and is insensitive to electrical interference, changes in pressure and temperature. It can be made of quartz, measures continuously and has a very good long term stability.

A big advantage is that the sensor is able to measure the height of liquids (surface level) having different indices of refraction without any change in calibration, without loss of accuracy. The range of indices which can be handled has no upper limit and has a lower limit equal to the index of refraction of the liquid or other light transmitting medium in the probe. This material can be selected to have a very low index. If water is used, almost all common liquids can be measured without calibration change.

Broadly, in accordance with the present invention, a liquid level sensor comprises an elongate housing having at least a window of light transmitting material with substantially parallel internal and external surfaces, an elongate light emitter and an elongate light collector extending in the housing, a light transmitting medium in the housing, and means for feeding light to the emitter and from the collector.

The sensor can comprise a tube which forms the housing, the tube being immersed in the container for the liquid, the level of which is to be sensed. Alternatively, the housing can be on the outside of the container, with a light transmitting window in the container.

A convenient electronic circuit provides a light source for the emitter and a detector connected to the collector. Various forms of display, and recording, can be provided.

The invention will be readily understood by the following description of certain embodiments by way of example, in conjunction with the accompanying drawings, in which:

FIG. 1 is a diagrammatic illustration of a level sensing apparatus, with the sensor shown in vertical cross-section;

FIG. 2 is a transverse cross-section, of the sensor, as on line II—II in FIG. 1;

FIG. 3 is a perspective view, to a longer scale, of the lower part of the emitter and collector unit.

FIG. 4 is a transverse cross-section through a light guide either emitter or collector;

FIG. 5 is a perspective view, on a large scale, of part of a light guide showing a form of surface treatment;

Figure 6:
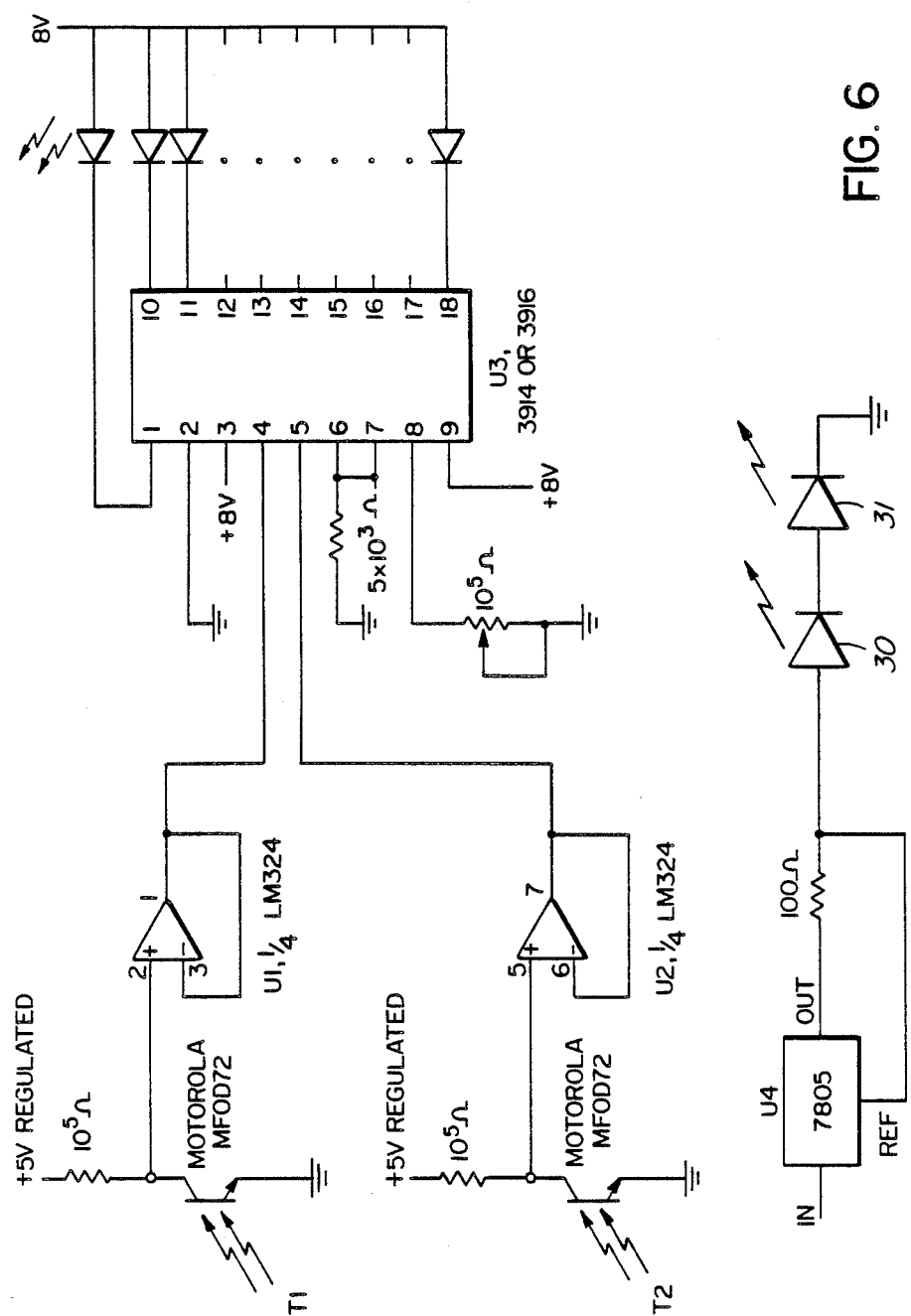
FIG. 6 is an electronic circuit for the collector and the emitter.

FIGS. 1 and 2 illustrate a liquid level sensor on probe 10, the probe comprising an emitter element 11 and a collector, or detector, element 12. In the example, elements 11 and 12 are plastic optical fiber light guides. The light guide are enclosed in a tube 13. Conveniently the light guide elements 11 and 12 are formed by removing the coating from two coated plastic optical fibers 14 and 15 respectively and treating the surfaces of the light guides to reduce internal reflections. The fibers 14 and 15 enter the tube 13 via a seal 16. The fibers 14 and 15 extend to a photo-emitter 17 and a photo detector 18 respectively. The emitter 17 and the detector 18 are part of an electronic measuring system 19 and a display 20.

The emitter 11 forms an elongate linear luminous body, and the collector 12 is similarly a long linear collector. The tube 13 is optically clear. The interior of the tube is filled with a material 21 having a low index of refraction—normally at least lower than the index of refraction of the liquid to be measured. The probe is inserted into the container of the fluid to be measured.

Light from the emitter 11 reaches the outer surface of the tube wall. If air surrounds the tube, some light from the emitter 11 is reflected back from the outer surface of the tube wall and strikes the collector 12. If a liquid surrounds the tube, none of the light striking the outer surface of the tube is returned to the collector. This is achieved by selecting the indices of refraction of the various materials forming the probe such that when the liquid to be measured surrounds the probe, any light that does not leave the probe entirely is kept within the outer wall of the probe, that is in the wall of the tube 13, by repeated total internal reflections between the inner and outer surfaces of the wall.

Thus, with no liquid present, or having a level below the bottom end of the probe a considerable amount of light is reflected back to the collector. When the probe is completely immersed in the liquid, substantially no light is reflected back to the collector. This represents the extremes. With liquid having a level part way up the probe, no light is reflected back to the collector at a level below the surface level of the liquid. Light is reflected back to the collector above the surface level. Depending upon the level of the surface of the liquid more or less light returns to the collector and this varying flux of light is used to produce an indication of level.

Normally the lower end of the probe is closed to prevent the internal components of the probe from contacting the liquid to be measured. In some forms of the instrument the bottom would be left open. In such an arrangement, the liquid to be measured would also be the liquid 21 in the probe, in which case the apparatus would be arranged such that the liquid completely fills the probe at all times.

The probe can be of any length equal to or greater than the maximum height of the liquid to be measured. While a circular cylindrical shape has been drawn, other shapes can be used. The ratio of diameter, or similar cross-section, to length of the probe should be kept small if maximum accuracy is to be achieved.

The probe is calibrated by varying the height of a liquid with respect to the probe and noting readings at an indicator.

The emitter and collector elements 11 and 12 can be made to emit or collect light along their length by various means. One example is roughening the surfaces of plastic optical fibers. Only a quarter of the circumference of the emitter need be roughened. This portion of the circumference would face away from the collector. Opposite quarters of the circumference of the collector need to be roughened and these portions would face away from and toward the emitter. Light emitter from the emitter and reflected back passes through the emitter to the collector.

The plastic fiber can be roughened by sandpaper, steel wool, dipping in solvent or etc. If a glass fiber is used, mechanical or chemical abrading can be done, and conveniently opposite portions of both emitter and collector are treated.

A convenient way of roughening the surface of plastic elements is by heat forming. This comprises pressing the fibers slightly between heated metal surfaces, which can be serrated or otherwise formed. The pressing can form a serrated or corrugated surface, on one side or opposite sides. FIG. 4 illustrates one cross-section with a serrated surface 25 at one position and FIG. 5 illustrates a short length of an element having serrated surfaces 26, 27 on opposite sides. The angle of the serrations can vary. After treatment, an element emits or collects some light along the length while transmitting a portion of any light within it to either end. An element also permits passage of a portion of light through it, to the other element. The roughening need not be continuous along the length. Emission and/or collection would occur at discrete intervals and still produce a satisfactory result, because the emitted light will tend to diverge and spread, as will reentering light.

The two elements or light guides 11 and 12 are held together closely, as by loop winding round them with a metal wire 28, or similar member, as illustrated in FIG. 3. The ends of the elements 11 and 12 can be given an opaque covering 29.

The material 21 inside the probe can vary. For many uses water is very acceptable as it has a low refractive index. The elements are placed near the center of the tube and the winding 28 can also act as a centering device. Alternatively the elements can be held together by adhesive and can be held in position in the tube by adhesive. Thus one example is an epoxy cement which filled the tube, held the elements 11 and 12 in position and acted as the material 21.

If an element, that is an emitter 11 or a collector 12, is treated, that is roughened, uniformly along its length it will have an emission or sensitivity profile that diminishes toward the bottom of the probe. The elements can be treated non-uniformly to produce a profile that does not diminish. This is readily done with heat formed plastic fiber.

The electronic circuitry contains a means of powering the emitter element 11 and also a means of measuring the light collected by the collector element 12. One particular form of electronic circuitry is diagrammatically shown in FIG. 6. The circuit is used to measure the difference in signals from a reference probe which is always in air, and a main probe which is placed in the liquid whose level is to be measured.

The circuit contains two light detectors, phototransistors T1 and T2, which translate light from the two probes into electrical signals. Operational amplifiers U1 and U2 are connected as followers exhibiting high input impedance, to prevent loading of the signals by the inputs of the dotbar display driver U3. The driver U3 is connected so that the difference between the voltage from the reference path and the voltage from the main path causes the light-emitting diodes (LED) 1 to 9 to light up in sequence according to how large the voltage difference is. The reference probe includes an optical means of adjusting its light output so that when the liquid level is zero there is no voltage difference between the two paths. The potentiometer R1 is adjusted so that when the liquid level is maximum, all the LED's are lit.

The dot-bar display driver may be a 3914, which will display a linear function of the voltage difference. The approximately logarithmic response of probe voltage to liquid level can be partly compensated for by using a 3916 integrated circuit. The circuit also contains a power supply for the light-emitting diodes used for illuminating the emitter elements in the probes. The supply uses a 7805 voltage regulator U4, connected as a source of constant current, which is applied to the LED's 30 and 31 in series. These LED's will have the same current through them and have nearly equal power applied to them.

The circuit described and illustrated is only an example, and many forms of circuit can be used. It is also possible to omit the reference probe and detect and evaluate the light differences in the detector path from the main probe. It will be appreciated that if opposite sides of each element 11 and 12 are roughened, then light from element 11 will strike directly on to the collector element. This will be in addition to the light reflected back from the outer tube surface. It is possible to provide an electronic circuit which will offset or allow for this "direct" light.

Figure 7:
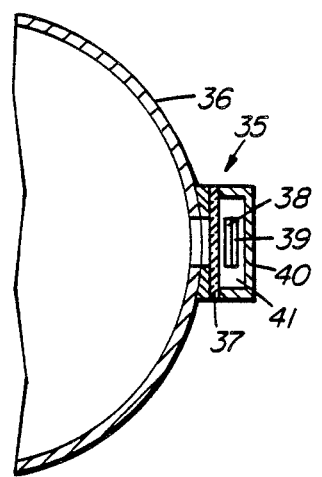
FIG. 7 illustrates an alternative form of light guide, and an alternative application.

Instead of filamentary emitter and collector elements, as in FIGS. 1 to 5, planar elements can be used. Such an arrangement is illustrated in FIG. 7, which also shows a probe 35 mounted on the outside of a liquid container 36. A transparent window 37 is positioned over an aperture in the container 36 and planar emitter and collector elements 38 and 39 respectively are positioned within a housing 40. A material 41 of low refractive index fills the housing. The probe operates in the same way, light being reflected from the surface of the window remote from the elements 38 and 39 when air is in the container, and no light being reflected when liquid is in the container.

Figure 8:
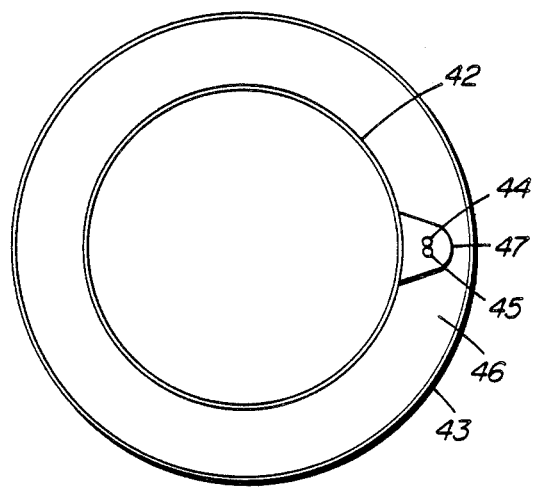
FIG. 8 illustrates yet a further form of application.

FIG. 8 illustrates a further arrangement where the container 42 for a liquid is surrounded by another container 43. Emitter and collector elements 44 and 45 are positioned in the annular space 46 between the two containers. Conveniently a parabolic reflector 47 can be positioned around the elements. The annular space 46 is filled with a matreial of low refractive index. The elements are at the focus of the parabola.

Figure 9:
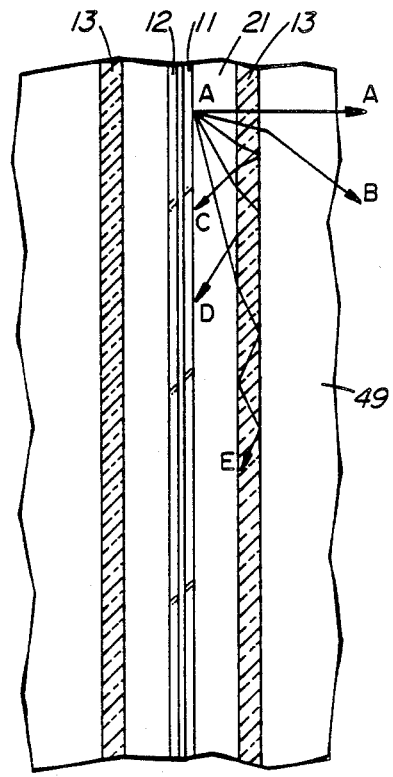
FIGS. 9 and 10 illustrate the alternate behaviour of light rays in a sensor in air and in a liquid respectively.
Figure 10:
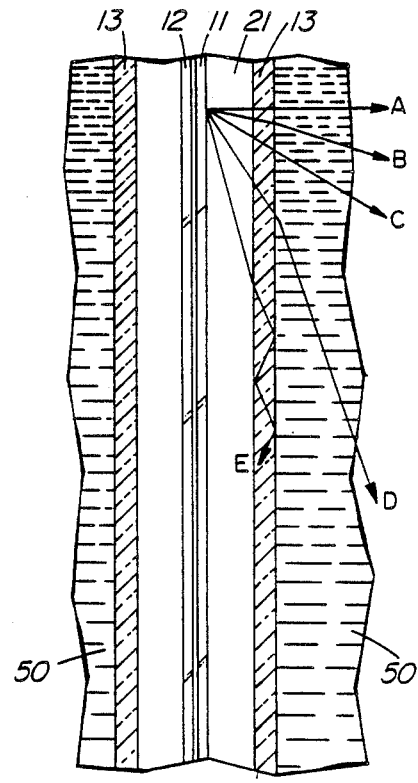

The operation of a probe can be readily understood by considering a two dimensional model, as illustrated diagrammatically in FIGS. 9 and 10. In FIGS. 9 and 10 the same reference numerals are used for the same items, and correspond, where applicable to the reference numerals in FIGS. 1, 2 and 3. In FIG. 9 the probe is in air, at 49, while in FIG. 10 the probe is immersed in a liquid 50. A medium, such as water is in the space 21. The various indices of refraction are as follows: for the medium 21 - n1; for the wall of the tube 13 - n2; for the air 49 in FIG. 9-n3a; and for the liquid 50 in FIG. 10 - n3b. The following relationships hold between the indices of refraction:

n1 is less than n2
n3a is less than n3b
n1 is less than or equal to n3b
n1 is greater than n3a
n2 is greater than n3a Considering a ray leaving the emitter element 11, a ray impinging on an interface between two media will be said to have an angle of incidence of 0 degrees if it is normal to the interface. The behaviour of a ray of light impinging on an interface between two optical media is determined by Snell's law:

$$n\sin a = n'\sin a'$$

where a is the angle of incidence of a ray of light travelling in a medium with an index of refraction n on one side of the interface, and a' is the angle of refraction for the light leaving the interface in the medium (of index n') on the other side.

There are conditions for which the light is not refracted, but rather is reflected back from the interface back into the medium from which it arrived. This is called total internal reflection. The angle of incidence for which this begins to occur is called the critical angle. All angles greater than this will lead to total reflection. The critical angle is found from a special case of Snell's law:

$$\sin \text{acrit} = n'/n$$

where acrit is the critical angle for a ray travelling from a medium of index n into a medium of index n'. It is important to note that n' must be less than or equal to n for a critical angle to exist. In other words, the ray must be incident on a surface whose index is smaller than that in which it is travelling, for total internal reflection to occur.

When total internal reflection occurs, a ray of light is reflected at the same angle as that of the incidence.

The emitter rod acts approximately like a diffuse luminous body. Rays are emitted from its surface in a multiplicity of directions. Five rays are shown leaving the emitter 11 at different angles in FIG. 9. The same five are shown leaving the emitter 11 in FIG. 10. In order of increasing angle of incidence at the interface between the internal medium 21 and the wall medium 13, the rays are labelled A-A, A-B, A-C, A-D, and A-E.

All rays leaving the emitter 11 pass through the internal medium and reach the interface between the medium and the wall. All of these rays pass into the wall 13 because it has an index of refraction greater than that of the internal medium (i.e., there is no critical angle for these rays). The rays are refracted according to Snell's law. Up to this point, the rays behave identically in FIGS. 9 and 10.

At the interface between the wall 13 and the outer medium 50 there will be a critical angle (acrit 13-50) if the index in the outer medium is less than the index in the wall medium. n3a is always less than n2, by design. It will be seen that, regardless of whether n3b is greater than, smaller than, or equal to n2, no light will return to the collector from the liquid 50. In cases where n3b is greater than or equal to n2, there is no critical angle, and all rays pass from n2 into n3a and never return. The following applies to the case where n3b is less than n2. For rays incident at or below the critical angle (in FIG. 9, A-A and A-B; in FIG. 10, A-A, A-B, A-C, and A-D), all the light will be refracted as it leaves the wall, and will not return, it being assumed that there are no reflecting bodies in the outer medium. Rays incident at angles greater than the critical angle will be reflected, and will travel within the wall medium back toward the internal medium, with angles of incidence ranging from the critical angle (acrit 13-50) up to 90 degrees. In FIG. 9, such reflected rays are represented by A-C, A-D, and A-E; in FIG. 10, by A-E.

These returning rays will strike the interface between the wall and the internal medium. In this direction, they are attempting to pass from a medium of larger index into one of smaller index, so there is another critical angle (acrit 13-21). Only those rays between 0 degrees and acrit (13-21) will be able to pass back into the internal medium (in FIG. 9, A-C, A-D; in FIG. 10, none). Rays incident at angles greater than the critical angle will be reflected back toward the interface between the wall and the fluid 50. They will strike for the second time at the same angle they first struck, and will again be reflected back. They will reflect back and forth internally, travelling to the end of the wall. This is the behaviour of rays A-E in both figures.

The range of rays that can pass from wall into internal medium 21, and thus strike the collector 12 can be determined analytically. Rays are incident on the interface between internal medium 21 and the wall 13 only between acrit (13-50) and 90 degrees. This is the range of all rays that left interface (13-50) by means of reflection above the critical angle acrit (13-50). Of these rays, only rays between 0 degrees and acrit (13-21) can pass from the wall into the internal medium, any rays of larger angle being above the critical angle for the interface.

The two ranges overlap only if acrit (13-21) is larger than acrit (13-50). This can happen only if n1/n2 is larger thn n3/n2, which is equivalent to stating that light can pass back into the internal medium (21) only if n1 is larger than n3. If it passes back, some of it will fall on the collector 12, especially if the emitter 11 is translucent. If it does not pass back, the light reaching the collector will be reduced by that amount. It is the presence or absence of this reflected light that forms the basis of the measurements performed by the invention.

There will be reflected light only if n1 is larger than n3, which would certainly be the case if the internal medium 21 is water (index=1.33) and the external medium 50 is air (index=1.0). When a liquid of index larger than n1 (almost all indices for liquids are larger than 1.33) replaces the air, it has been shown above that no light will be able to pass from the wall 13 into the internal medium 21, so the reflected amount will not appear at the collector 12.

The above can easily be expanded and shown to work also for media arranged in the form of parallel plates, or as concentric tubes. The arrangement consisting of concentric tubes is very convenient because most of the light reflecting back into the internal medium will impinge on the detector. The device can also be used to measure the position of an interface between two dissimilar liquids rather than between a liquid and air. It should also be clear that other combinations of gasses and liquids or any two dissimilar optical media can be the subject of measurement, and that the interface between the substances need not be horizontal. The only criteria to be met are the relations between the indices of refraction. Let n1, n2, and n3 by the indices of the three media described above in relation to the two dimensional model. Let n3a be the index of the external medium when it consists of substance a. Let n3b be the index of the external medium when it cnsists of substance b. (In the more specific previous description, a is air, b is the liquid to be measured.) The criteria to be met are:

n1 must be less than n2.
n2 must be less than or equal to n3b.
n1 must be greater than n3a.
n2 must be greater than n3a.

As has been shown above, these criteria are generally easy to meet. The only problem would arise if n3a and n3b are very close in magnitude. This would require careful selection of n1. In this case it would probably be easiest to have substance b serve as the internal medium as well as the external substance to be measured.

For the arrangement illustrated in FIG. 8, the medium in the space 46, the wall of the container 42 and the liquid in the container 42 satisfy the same criteria concerning index of refraction as items 21, 13 and 50 in FIGS. 9 and 10. In the example the medium in the space 46 is free to pass into the mirror 47. The operation of the probe is the same as exemplified in FIGS. 9 and 10 except that the light emitted from the emitter element 44 enters the liquid in the container as parallel rays, because of the parabolic mirror 47. Light returning from the liquid in the container is focused back onto the detector element 45.

The invention is particularly applicable to the measurement of liquid reagents for semiconductor wafer treatment processes. Most reagents are usually contained in "bubblers" or flasks and must be maintained in a condition of high purity. It is important to measure the height of the liquid so that processing of expensive loads of wafers is not interrupted during a run—spoiling the wafers. Another application is the measurement of the height of cryogenic liquids, such as liquid nitrogen. Other applications are measuring the heights of lubricating and wetting fluids, fuels, and similar liquids, and incorporation in control systems to maintain constant height or to control changes in the rate of height of a liquid.

What is claimed is:

1. A liquid level sensor comprising:
   an elongate housing having at least part of its periphery of light transmitting material;
   an elongate light emitter and an elongate light collector extending side-by-side in said housing;
   a light transmitting medium in the housing and surrounding said emitter and said collector;
   means for feeding light to the emitter and means for feeding light from the collector;
   the index of refraction of said light transmitting medium being less than the index of refraction of said light transmitting material of said housing; and
   the index of refraction of said light transmitting medium being one of less than or equal to the index of refraction of the liquid the level of which is being sensed.

2. A sensor as claimed in claim 1, said emitter and said collector comprising lengths of uncoated optical fiber.

3. A sensor as claimed in claim 1, said housing comprising a transparent tube.

4. A sensor as claimed in claim 1, at least part of a peripheral surface of each of said emitter and said collector being roughened.

5. A sensor as claimed in claim 4 said peripheral surface being serrated.

6. A sensor as claimed in claim 1, said housing being sealed at a lower end.

7. A sensor as claimed in claim 1, said emitter and said collector comprising planar elements, extending parallel to each other, said collector being positioned between said emitter and said part of the periphery of said housing.

8. A sensor as claimed in claim 1, and housing adapted to be mounted on the outside of a liquid container.

9. A sensor as claimed in claim 1, said housing adapted to be positioned within a liquid container.

10. A sensor as claimed in claim 1, including a light emitting device said means for feeding light to said emitter comprising a light guide intruding between said light emitting device and said emitter.

11. A sensor as claimed in claim 10, including a light detector, said means for feeding light from the collector comprising a light guide extending from said collector to said detector.

12. A sensor as claimed in claim 11, including means for producing a signal related to the light collected by the collector.

13. A sensor as claimed in claim 1, wherein said light transmitting medium is water.

14. A sensor as claimed in claim 1, wherein said light transmitting medium is the liquid, the height of which is to be sensed.

* * * * *